United States Patent [19]

Segar

[11] 4,090,452
[45] May 23, 1978

[54] POWER RAIL, CONTROL SIGNAL RAIL AND GUIDE BEAM ARRANGEMENT FOR A TRANSPORTING SYSTEM

[75] Inventor: William R. Segar, Monroeville, Pa.

[73] Assignee: Westinghouse Electric Corp., Pittsburgh, Pa.

[21] Appl. No.: 639,955

[22] Filed: Dec. 11, 1975

[51] Int. Cl.² .............................................. B61F 9/00
[52] U.S. Cl. .................................... 104/247; 104/130; 104/148 R; 191/32; 246/419
[58] Field of Search ................. 104/130, 140, 148 R, 104/148 LM, 195, 243, 245, 246, 247, 120; 191/22 R, 30, 32; 246/314, 419, 430, 435 R; 174/70 B; 339/21 S, 22 T; 105/145

[56] References Cited

U.S. PATENT DOCUMENTS

| 1,805,175 | 5/1931 | Hanak | 191/22 R |
|---|---|---|---|
| 3,126,179 | 3/1964 | Bonanno | 104/148 R X |
| 3,223,048 | 12/1965 | Gorjanc | 104/130 X |
| 3,533,356 | 10/1970 | Toutoundjis | 104/120 X |
| 3,672,308 | 6/1972 | Segar | 104/130 X |
| 3,791,306 | 2/1974 | Wagner et al. | 104/130 |

*Primary Examiner*—Albert J. Makay
*Assistant Examiner*—Randolph A. Reese
*Attorney, Agent, or Firm*—R. G. Brodahl

[57] ABSTRACT

A power and control signal rail arrangement is disclosed for at least one transportation vehicle directed along a roadway by guide wheels depending from the vehicle and which follow a guide beam incorporated in the roadway. The arrangement provides for mounting power rails and control signal rails on top of the roadway guide beam and also permits factory assembly of the power rails, the control signal rails, and the guide beam as a modular unit. The disclosure also describes a pivotal guide beam switch for directing vehicles between a first and second roadway or, alternatively, between a first and third roadway. A power and control signal rail arrangement cooperative with suitable vehicle collectors provides continuous power and control signals to the vehicle as it passes through the pivotal guide beam switch.

12 Claims, 19 Drawing Figures

POWER RAIL, CONTROL SIGNAL RAIL AND GUIDE BEAM ARRANGEMENT FOR A TRANSPORTING SYSTEM

CROSS REFERENCES TO RELATED APPLICATIONS

Reference is made to U.S. patent application Ser. No. 638,001 of W. R. Segar filed Dec. 5, 1975 and entitled "Pivotal Guide Beam Switch For a Transportation System", which application is assigned to the same assignee as the present invention.

BACKGROUND OF THE INVENTION

1. Field of the Invention

The disclosed invention relates to an arrangement of power and control signal rails through which power and control signals are carried to transportation vehicles operating on the roadway of a transportation system.

2. Description of the Prior Art

Transportation systems employing at least one self-propelled, rubber tire vehicle which traverses a roadway comprises of laterally spaced, parallel tracks are well known in the prior art and generally described in "Transit Expressway Report" of the MPC Corporation, 4400 Fifth Ave., Pittsburg, Penna. 15213, dated Feb. 20, 1967 and in U.S. Pat. No. 3,312,180 of E. O. Mueller. In these prior art transportation systems, the vehicles were directed along the roadway by guide wheels depending from the bottom of each vehicle and traveling a guide beam supported parallel to the roadway tracks. Also in these transportation systems, electric power was supplied to the vehicle through current collectors in contact with power rails mounted in relation to the guide beam or to the roadway tracks. Control signals were supplied to the vehicle through antennas mounted on the roadway by adhesives.

In one power rail mounting arrangement known in the prior art, power rails were mounted in insulative brackets fixed to the roadway tracks such that the rail surfaces in contact with the collectors were in a horizontal plane. However, this prior art arrangement for mounting power rails on transportation system roadways required extensive adjustment at the installation site to obtain proper alignment between the rails and the collectors mounted on the vehicle, making this arrangement expensive and difficult to implement. In addition, since this arrangement could not provide power to a vehicle traveling through roadway switching areas, it required additional sets of power rails and complementary collectors at the roadway switching areas.

A second power rail arrangement known in the prior art provided for bracketing the power rails to a lower flange of the guide beam such that the rail surfaces in contact with the collectors were located below the horizontal plane of the vehicle guide wheels. Since this arrangement would allow the guide wheels to pass over the power rails, power could be provided to the vehicle as it traveled through the roadway switching areas. However, since the power rails were also located close to the roadbed, this arrangement was susceptible to accumulations of dirt and moisture on the collection surfaces of the rails.

Both of these prior art arrangements permitted lateral or rolling forces acting on the vehicle to interfere with the contact between the collectors and the rails and, for transportation systems with vehicle turn-around capability, required multiple sets of power rails, power collectors and control signal receivers. Also, since the power rails of the prior art arrangements were laterally disposed, reactive interference between power rails carrying a multiple phase alternating power signal limited the efficiency of the signal rail arrangements of the prior art.

Therefore, there was a need for a new power and control signal rail arrangement which could be installed without extensive adjustments; which would provide power and control signals to a vehicle in roadway switching areas; and which would be resistant to interference from dirt and moisture. The new rail arrangement should also be less susceptible to interference with collector-rail contact caused by lateral or rolling forces acting on the vehicle; reduce the reactive interference between power rails; and provide turn-around capability with a single set of power and control signal rails.

SUMMARY OF THE INVENTION

The present invention relates to an improved power and control signal rail arrangement for providing power and control power signals to at least one vehicle in a transportation system through collectors mounted on the vehicle. The rail arrangement permits factory assembly of the power and control signal rails and the roadway guide beams into modular units, which may be pre-matched to provide simpler and more economical installation by mounting the rails in brackets and fixing the mounting brackets to the upper flanges of a guide beam which directs the vehicle along the roadway. Mounting the power and control signal rails from the upper flange of the roadway guide beams, such that the collection surfaces are in a vertical plane, also makes the power and control signals resistant to interference caused by accumulations of moisture and dirt on the collection surfaces of the rails. The rails of the disclosed arrangement are disposed close to the longitudinal axis of rotation of the vehicle wheels to decrease the interference from lateral and rolling forces acting on the vehicle with the contact between the collectors and the rails. The power rails are disposed in a triangular relation which reduces the reactive interference between phases of a multiple phase alternating power signal. The off-center arrangement of the power rails provides vehicle turn-around capability for transportation systems having roadways equipped with power and control signal rails. Power and control signals are provided to the rails through electrical conductors which lie partially in the vertical center plane of the guide beam. A modification of the rail arrangement forms a tapered power rail arrangement which continuously provides control and power signals to a vehicle traversing a pivotal guide beam switch through the same collectors associated with the rail arrangement mounted to the upper flange of the roadway guide beam.

BRIEF DESCRIPTION OF THE DRAWINGS

FIG. 10A is a detailed view of the encircled portion of FIG. 10.

PREFERRED EMBODIMENT OF THE INVENTION

Figure 1:
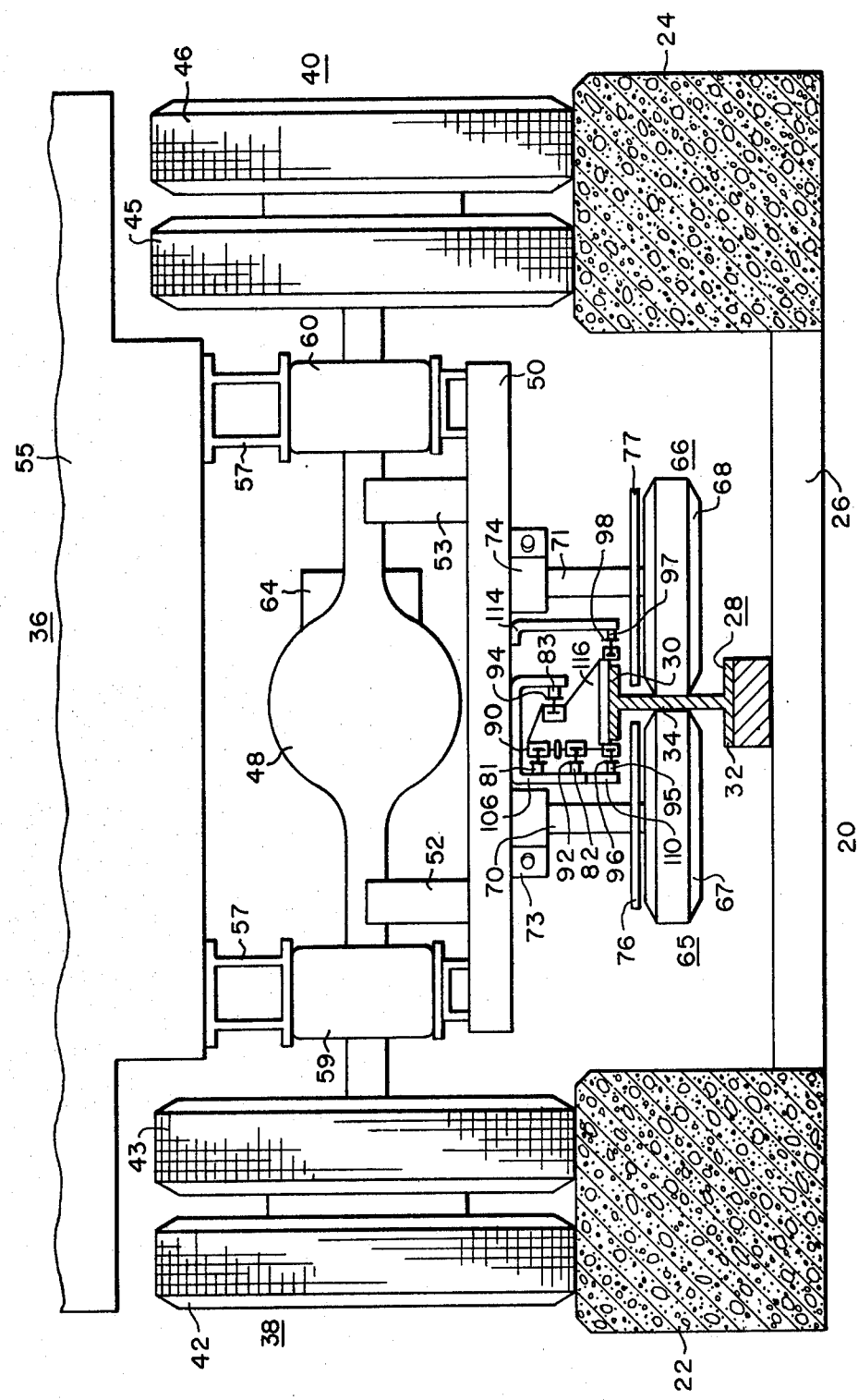
FIG. 1 is a cross-sectional view of a transportation system roadway taken in a plane perpendicular to the longitudinal axis of the roadway.

FIG. 1 is a cross-sectional view of a transportation system roadway 20 taken along the longitudinal axis of the roadway. Roadway 20 is comprised of laterally spaced concrete tracks 22 and 24 supported from a roadbed 26, and a flanged guide beam 28 located between tracks 22 and 24, and comprised of upper and lower horizontal flanges 30 and 32 joined by vertical web 34. FIG. 1 also shows a transportation vehicle 36 having a pair of resilient, laterally spaced vehicle main wheels 38 and 40 running on tracks 22 and 24, respectively. Wheel 38 is comprised of tires 42 and 43 and wheel 40 is comprised of tires 45 and 46. The vehicle 36 is provided with at least two such pairs of resilient, laterally spaced, wheels fixed longitudinally along the vehicle. The wheel pair 38, 40 shown in FIG. 1 is connected by an axle contained in an axle housing 48 which is fixed to the vehicle frame 50 by support brackets 52 and 53. The vehicle 36 is further provided with a body 55 mounted on a longitudinal frame 57 resiliently supported by air springs 59 and 60 mounted on channel members 62 and 63 mounted on vehicle frame 50. The vehicle is powered by an electric motor 64 coupled to the axle connecting wheels 38 and 40.

The vehicle steering mechanism includes sets of opposing guide wheels which follow opposite sides of guide beam web 34. FIG. 1 illustrates one such set of guide wheels 65 and 66, comprises of pneumatic, resilient tires 67 and 68, carried on vertical axles 70 and 71, which are clamped to vehicle frame 50 by split bushings 73 and 74. The ends of vertical axles 70 and 71 are clamped in a position which produces a predetermined force between the guide beam web 34 and pneumatic tires 67 and 68. Due to the resiliency of pneumatic tires 67 and 68, the normal operating distance between the surface of guide beam web 34 and the centerline of vertical axles 70 and 71 is somewhat less than the true radius of pneumatic wheels 67 and 68. This distance will be referred to as the "operating radius". Excessive deviations in the operating radius due to unusual lateral forces acting on the transportation vehicle 36 or due to under-inflation of pneumatic tires 67 or 68, are limited by steel safety discs 76 and 77 attached to vertical axles 70 and 71, respectively. The radius of each safety disc is slightly less than the operating radius of its associated pneumatic tire so that if a pneumatic tire 67 or 68 becomes deflated or the car experiences abnormally strong, lateral wind, centrifugal, or steering forces, the associated safety disc 76 or 77 will engage the web 34 of the guide beam 28 and assume steering control of the vehicle. The safety discs 76 and 77 serve a second function by cooperating with the upper flange 30 of guide beam 28 to oppose forces tending to cause the vehicle to roll.

Apparatus for supplying electric power and control signals to the vehicle includes power collectors 81, 82 and 83 in contact with power rails 90, 92 and 94, respectively; ground collector 95 in contact with ground rail 96; and control signal collector 97 in contact with control signal rail 98. Collectors 81, 82 and 83 are carried by bracket 106 fixed to the vehicle frame 50. Ground rail collector 95 is mounted in bracket 110 and signal rail collector 97 is mounted in bracket 114 which are similarly fixed to vehicle frame 50. Power rails 90, 92 and 94, ground rail 96 and signal rail 98 are insulatively supported by mounting brackets 116 attached at longitudinal intervals to the upper flange 30 of guide beam 28.

The arrangement shown in FIG. 1 for insulatively mounting power rails 90, 92 and 94, ground rail 96, and signal rail 98 from brackets 116 fixed to the upper flange of guide beam 28 provides an improved power rail, ground rail and signal rail arrangement. With the disclosed arrangement, because guide beam 28 is set within closer tolerances than roadway 20, and because the vehicle 36 is steered by the guide beam and not the roadway, the arrangement of fixing rails 90, 92, 94, 96 and 98 to guide beam 28 by brackets 116 provides accurate and convenient alignment with the rails and collectors 81, 83, 95 and 98.

This arrangement provides additional economies in installation of the rails by permitting factory assembly of the rails and guide beam into modular units which can be pre-matched at the factory for precise alignment and uniformity of the rail assembly.

Since the brackets 116 project above upper flange 30 of guide beam 28, the rails are disposed high above the roadbed 26 to make the power and control circuits less susceptible to interference caused by accumulation of dirt or moisture on the power and signal rails. Additionally, the power and signal rail arrangement disclosed in FIG. 1 illustrates that the collection surface of the rails is in a vertical plane which also serves to decrease power circuit and control circuit susceptibility to the accumulation of dirt and moisture on the rail collection surfaces.

The power rail, signal rail, ground rail and guide beam arrangement of FIG. 1 maintains improved contact between the vehicle collectors and the rail collection surfaces as the vehicle 36 experiences rolling and lateral forces which, for example, may be exerted by wind or centripetal force. Rolling forces experienced by vehicle 36 cause vehicle frame 50 to turn on a longitudinal axis of rotation at point A which projects into FIG. 1. Since guide wheels 65 and 66 act to center vehicle frame 50 over the web 34 of guide beam 28, the longitudinal axis of rotation of vehicle frame 50 is in the vertical plane of web 34. Locating the rails 90, 92, 94, 96 and 98 closer to the longitudinal axis of rotation of vehicle frame 50 will decrease the length of collector brackets 106, 110 and 114 and will decrease the arc traveled by collectors 81, 82, 83, 95 and 97 as frame 50 turns.

Since the disclosed power and control signal rail arrangement fixes rails 90, 92, 94, 96 and 98 to the upper flange 30 of guide beam 28, collector brackets 106, 110 and 114 are short and the arc traveled by collectors 81, 82, 83, 95 and 97 is small so that there is little relative motion between the rails and their associated collectors and, therefore, little interference between the rails and collectors caused by rolling forces acting on the vehicle.

Collection surfaces of rails 90, 92 and 94 are in a vertical plane and collectors 81, 82 and 83 are retractably mounted to collector bracket 106 by springs or in another well known manner to compensate for slight variations in the position of collector bracket 106 with respect to rails 90, 92 and 94. One cause of these variations may be due to lateral forces acting on the vehicle 36.

As is well known in the field of power transmission, among arrangements of closely grouped, three-phase conductors, the least reactive interference between phases is offered by triangularly disposed conductors. Power rails 90, 92 and 94 comprise such a low-reactance arrangement.

Figure 2:
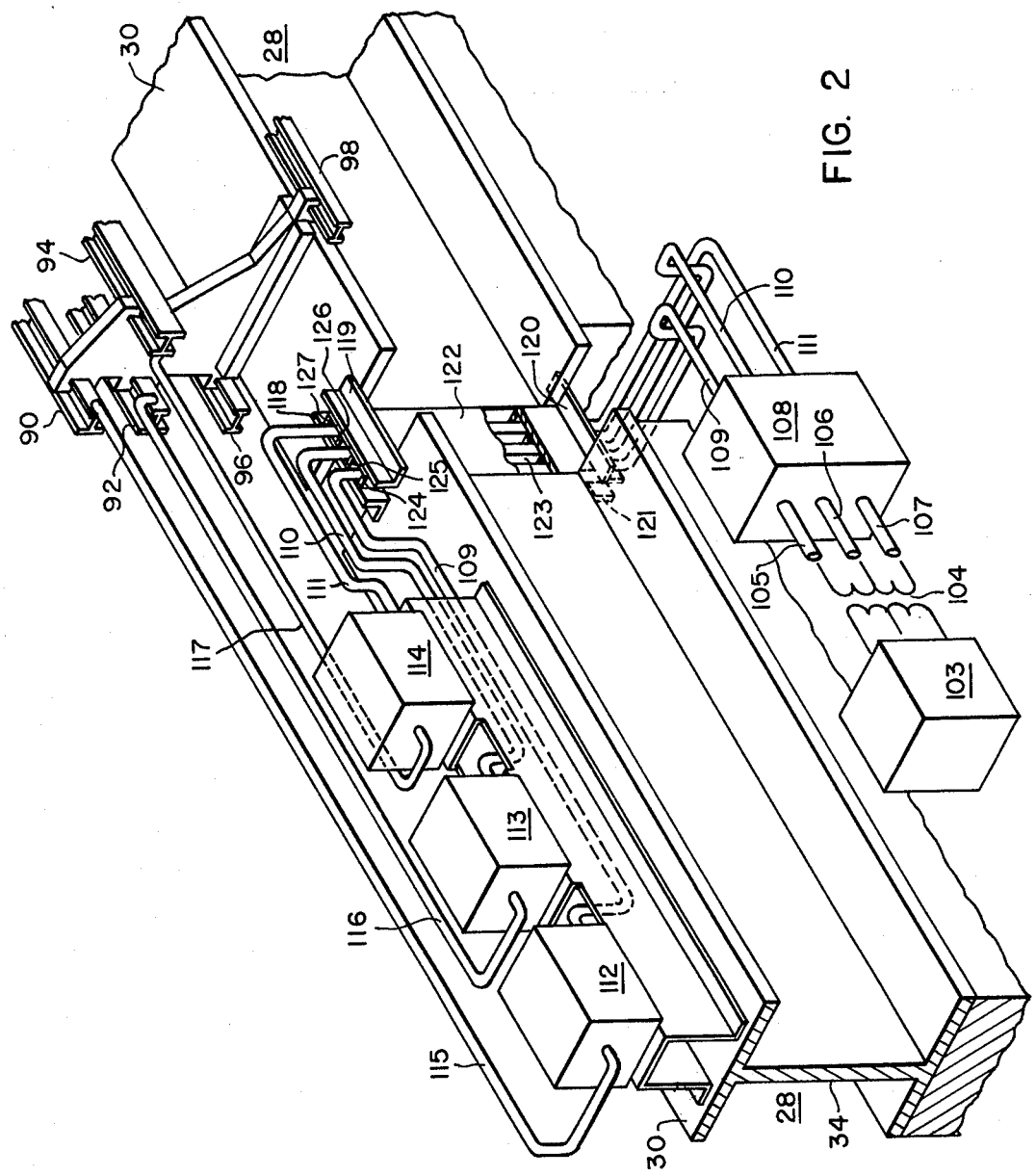
FIG. 2 is an isometric view of the power and signal rail arrangement of FIG. 1 showing an arrangement for providing power to the power rails.

FIG. 2 illustrates an arrangement for supplying power to power rails 90, 92 and 94 which permits the power rails and signal rail to be mounted on the upper horizontal flange 30 of guide beam 28. A commercial power source 103 is connected to the primary windings of a suitable power transformer 104 whose secondary windings produce the rated voltage of motor 64. Conductors 105, 106 and 107 connect the secondary windings of transformer 104 to wayside junction box 108 which is associated with a predetermined section of roadway 20. Wayside junction box 108 connects conductors 105, 106 and 107 to small diameter cables 109, 110 and 111, respectively. Small diameter cables 109, 110 and 111 partially lie in the vertical plane of web 34 of guide beam 28 to phase junction boxes 112, 113 and 114, respectively. In phase junction boxes 112, 113 and 114, small diameter cables 109, 110 and 111 are connected to conductors 115, 116, 117 respectively to provide power to power rails 90, 92 and 94.

Small diameter cables 109, 110 and 111, which may be comprised of copper jacketed MI cable, are maintained in the vertical plane of web 34 by cable brackets 118, 119, 120 and 121. Protective plates 122 and 123, separated by spacer bars 124, 125, 126 and 127, shield the small diameter cables 109, 110 and 111 from the vehicle guide wheels 65 and 66 and serve to maintain the continuity of the web 34 of guide beam 28.

In a similar fashion, control signals may be provided to the vehicle 36 through an electrical conductor passing through the vertical plane of web 34 of guide beam 28 to signal rail 98 and signal collector 97 in communication with the control equipment aboard the vehicle.

The position along the longitudinal axis of guide beam 28 at which the electrical conductor carrying the control signal passes through the plane of web 34 must be sufficiently distant from the position at which the small diameter cables 109, 110, and 111 pass through the plane of web 34 so that cables 109, 110 and 111 do not cause reactive interference with the control signal.

Figure 3:
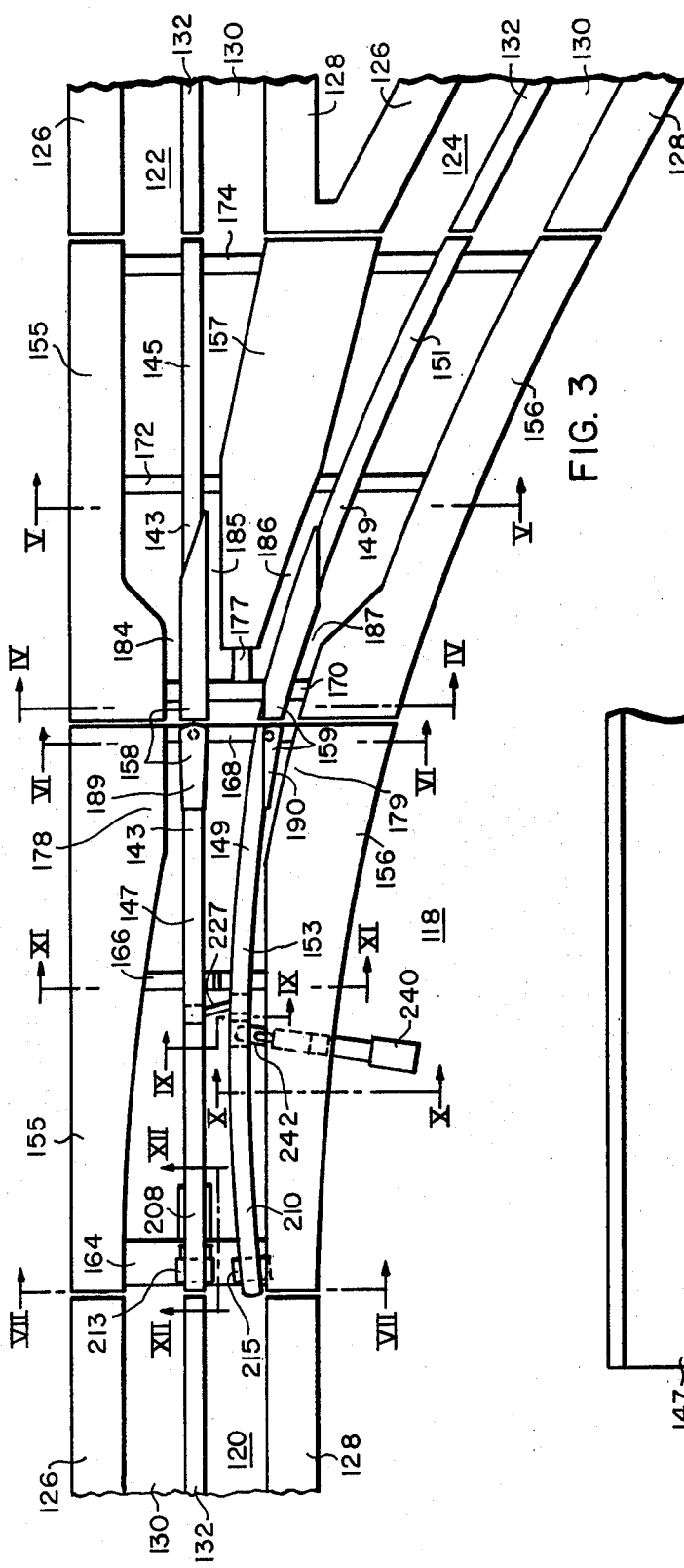
FIG. 3 is a top projection of a first, second and third vehicle roadway joined by a pivotal guide beam switch where, depending upon the position of the switch, a transportation vehicle is directed between the first and second roadways or between the first and third roadways.

FIG. 3 shows a pivotal guide beam switch 118 located at the junction of a first vehicle roadway 120, a second vehicle roadway 122 and a third vehicle roadway 124. Roadways 120, 122 and 124 are substantially similar to roadway 20 and are comprised of laterally spaced concrete tracks 126 and 128 supported from a roadbed 130, and a flanged guide beam 132 located between tracks 126 and 128. The pivotal guide beam switch 118 controls the direction of travel of a transportation vehicle between roadways 120 and 122 and between roadways 120 and 124. The pivotal guide beam switch 118 includes a first switching guide beam 143 comprised of a fixed guide beam section 145 and a pivotal guide beam section 147, and a second switching guide beam 149 comprised of fixed guide beam section 151 and pivotal guide beam section 153.

Figure 4:
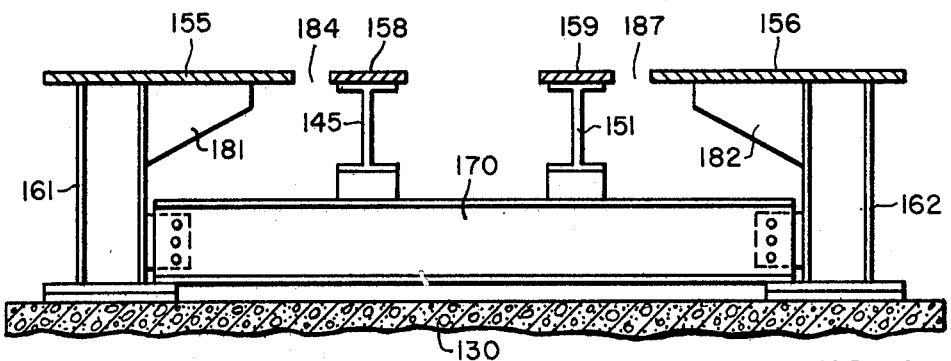
FIG. 4 is a cross-sectional view taken in the plane IV—IV of FIG. 3 and showing track surfaces and structure for supporting a vehicle of a transportation system and a pivotal guide beam switch.
Figure 5:
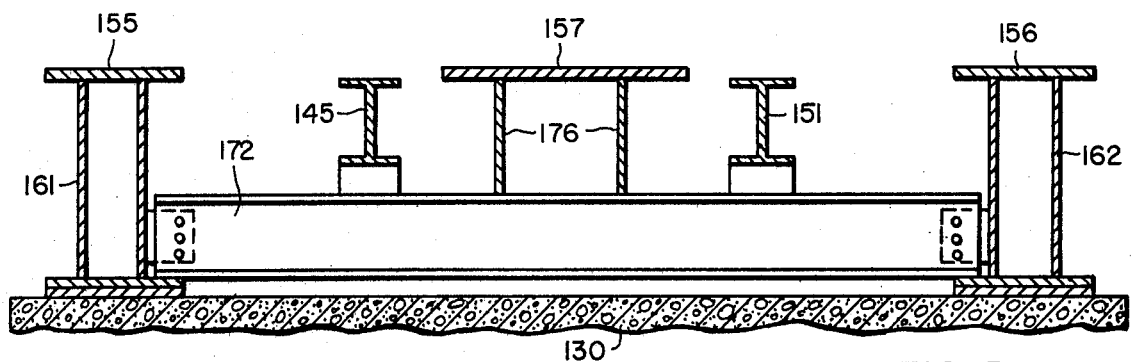
FIG. 5 is a cross-sectional view taken in the plane V—V of FIG. 3 and showing additional structure for supporting a vehicle of a transportation system and a pivotal guide beam switch.

The pivotal guide beam switch 118 is supported by the roadway junction structure shown in FIGS. 3, 4 and 5. FIGS. 4 and 5 are cross-sectional views of the roadway junction structure, respectively, taken along the lines III—III and IV—IV of FIG. 2. The roadway junction structure is comprised of track surfaces 155, 156, 157, 158 and 159 lying in the horizontal plane of tracks 126 and 128 to provide a running surface for the wheels 38 and 40 of a vehicle traveling between roadways 120 and 122, or roadways 120 and 124. Track surfaces 155 and 156 are supported by steel members 161 and 162, respectively. Steel members 161 and 162 are fixed to roadbed 130 and are fixed to each other by cross members 164, 166, 168, 170, 172 and 174. Track surface 157 is supported by frog member 176 which is fixed to cross members 172 and 174 and by longitudinal member 177 fixed between cross members 170 and 172. Track surface 158 is supported by fixed guide beam section 145 and pivotal guide beam section 147 of switching guide beam 143 and track surface 159 is supported by fixed guideway section 151 and pivotal guideway section 153 of switching guideway 149.

Track surfaces 155 and 156 have been laterally expanded to increase the track surface for vehicles travelling through switch 118. The lateral expansion of track surface 155 is supported by a number of arched supports 181 fixed at longitudinal intervals along steel member 161. Similarly, the lateral expansion of track surface 156 is supported by a number of arched supports 182 fixed at longitudinal intervals along steel member 162. Slot 184 is provided between track surfaces 155 and 158; slot 185 is provided between track surfaces 158 and 157; slot 186 is provided between track surfaces 157 and 159; and slot 187 is provided between track surfaces 159 and 156 to accommodate the vertical axles 70 and 71 of guide wheels 65 and 66 as the transportation vehicle 36 traverse the guide beam switch between roadways 120 and 122 and between roadways 120 and 124. Arched supports 181 and 182 which support lateral expansions of track surfaces 155 and 156 are arched to accommodate the guide tires 62 and 68 and safety discs 76 and 77 of guide wheels 65 and 66 as the transportation vehicle traverses the switch 118. Slots 184, 185, 186 and 187 do not materially affect the smoothness of the vehicle's ride because the angle at which the vehicle passes over slots 184, 185, 186 and 187 in combination with the pairs of tires 42, 43 and 45, 46 which comprise wheels 38 and 40 maintain continous tread contact between wheels 38 and 40 and the track surfaces 155, 156, 157, 158 and 159 and prevent two wheels of vehicle 36 from simultaneously crossing the slots.

As shown in FIG. 3, the pivotal guide beam switch 118 provides for travel of a transportation vehicle between roadways 120 and 122 or, alternatively, between roadways 120 and 124 by controlling the positions of pivotal guide beam sections 147 and 153 of switching guide beams 143 and 149. When vehicles are to be directed between roadways 120 and 122, pivotal guideway section 147 is pivoted so that its longitudinal axis is in-line with the longitudinal axes of guide beams 132 off roadways 120 and 122. When vehicles are to be directed between roadways 120 and 124, pivotal guideway section 153 is pivoted so that its longitudinal axis is in-line with an arc tangential to the longitudinal axes of guide beams 132 of roadways 120 and 124.

Fixed guide beam section 145 is permanently mounted to cross members 170, 172 and 174 such that its horizontal axis is substantially in-line with the horizontal axes of the guide beams 132 of roadways 120 and 122. Fixed guide beam section 151 is permanently mounted to lateral cross members 170, 172 and 174 such that its longitudinal axis is substantially in-line with an arc which is tangential to the longitudinal axes of guide beams 132 of roadways 120 and 124.

Figure 6:
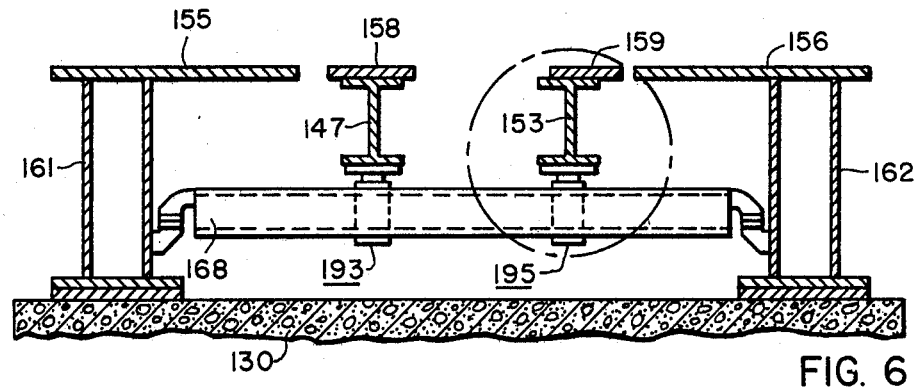
FIG. 6 is a cross-sectional view taken in the plane VI—VI of FIG. 3 and showing a bearing assembly included in the pivotal guide beam switch.
Figure 6A:
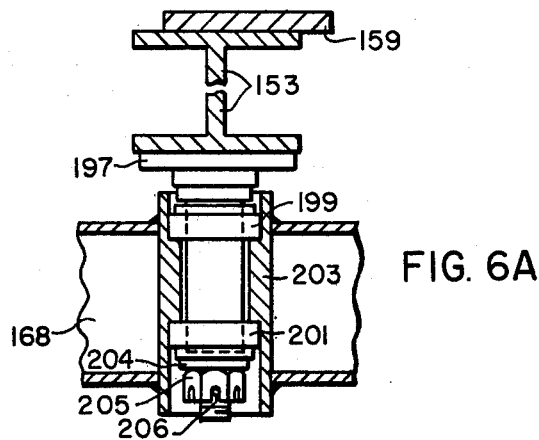
FIG. 6A is a detailed view of the encircled portion of FIG. 6.

The pivot ends 189 and 190 of pivotal guide beam sections 147 and 153 are supported by anti-friction bearing assemblies 193 and 195 mounted on cross member 168 as shown in the cross-sectional view of FIG. 6 taken along line VI—VI of FIG. 3. FIG. 6A includes a sectioned view of the anti-friction bearing assembly 195 showing a bearing post 197 fixed to pivotal guide beam section 153 and pressed into the inner race of upper bearing 199 and lower bearing 201. The outer races of bearings 199 and 201 are press fitted into casing 203 which is fixed to channel-type cross member 168. A washer 204, nut 205 and cotter pin 206 lock the bearing assembly together.

Figure 7:
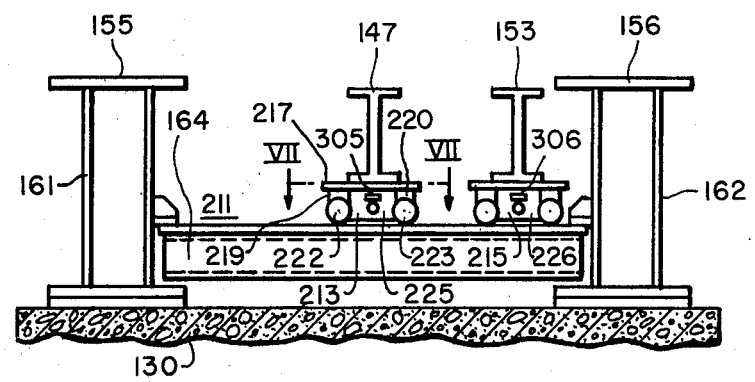
FIG. 7 is a cross-sectional view taken in the plane VII—VII of FIG. 3 and showing a platform and roller assembly included in the pivotal guide beam switch.

The travel ends 208 and 210 of pivotal guide beam sections 147 and 153 are supported by a platform and roller assembly 211 shown in the cross-sectional view of FIG. 7 taken along the lines VII—VII of FIG. 3. The platform and roller assembly 211 includes platform-type cross member 164 fixed between steel members 161 and 162 and supporting roller 213 which carries pivotal guide beam section 147 and roller 215 which carries pivotal guide beam section 153.

Figure 8:
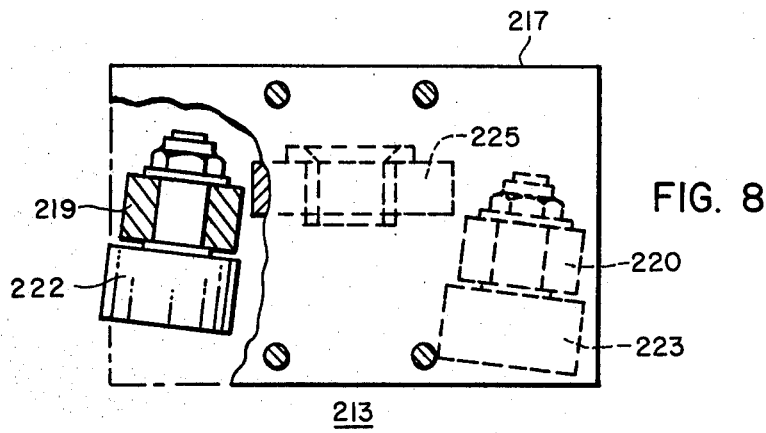
FIG. 8 is a cross-sectional view of a roller included in the pivotal guide beam switch and taken in the plane VIII—VIII of FIG. 7.

Roller 213 is also shown in FIG. 8 taken along line VIII—VIII of FIG. 7 and includes mounting plate 217 fixed to pivotal guide beam section 147, wheel blocks 219 and 220 fixed to mounting plate 217 and wheels 222 and 223 rotatably retained in wheel blocks 219 and 220. Wheel blocks 219 and 220 are fixed to mounting plate 217 at a predetermined angle with respect to the longitudinal axis of pivotal guide beam section 147 such that the axes of rotation of wheels 222 and 223 is parallel to the radius of the arc traveled by travel end 208 of pivotal guide beam section 147. Mounting plate 217 also carries locking bracket 225 so that pivotal guide beam section 147 may be locked in a predetermined position, as will be explained later. Roller 215 is substantially identical to roller 213 and includes locking bracket 226. Since rollers 213 and 215 are substantially identical, roller 215 is not described in detail.

Figure 9:
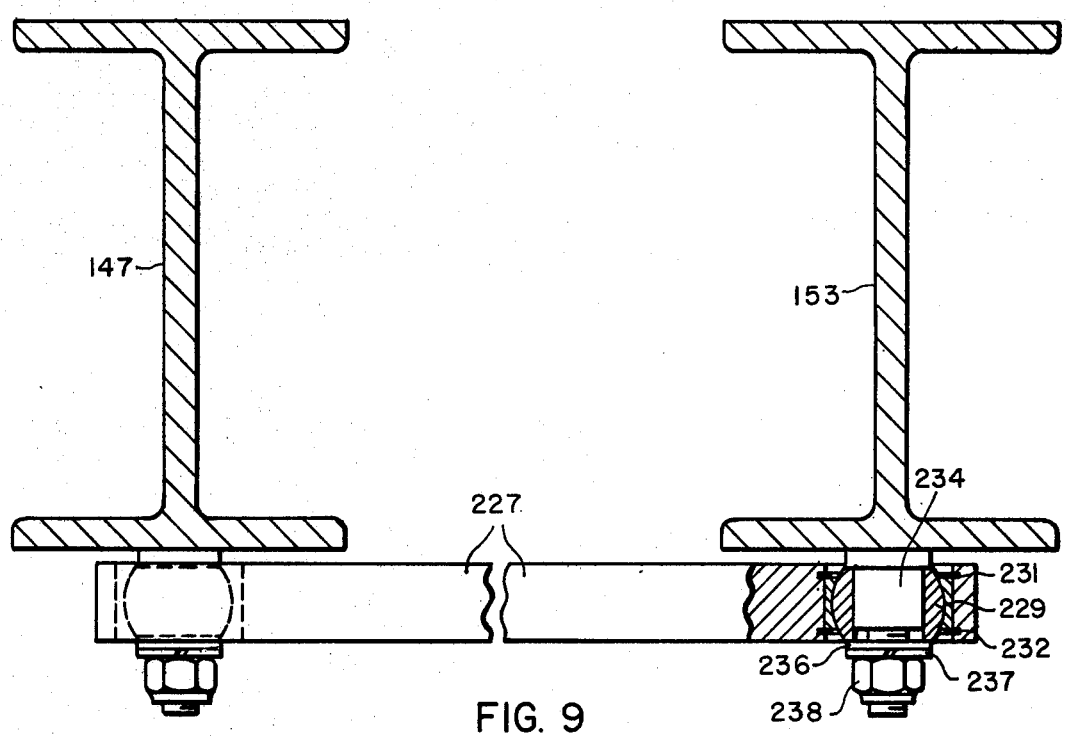
FIG. 9 is a cross-sectional view of a tie rod included in the pivotal guide beam switch and taken in the plane IX—IX of FIG. 3.

Pivotal guide beam sections 147 and 153 are maintained in a predetermined relation to each other by tie rod 227 which is pivotally coupled to pivotal guide beam sections 147 and 153 through the bearing assembly shown in the cross-sectional view of FIG. 9 taken along the line IX—IX of FIG. 3. In FIG. 9, bearing 229 is retained in tie rod 227 by retaining rings 231 and 232 and is press fitted onto a stud 234 which is fixed to pivotal guide beam section 153. The bearing 229 is locked onto stud 234 by washer 236, lock washer 237 and elastic stop nut 238. The opposite end of the rod 227 is pivotally coupled to section 147 through a substantially identical bearing assembly which is not described in detail.

Figure 10:
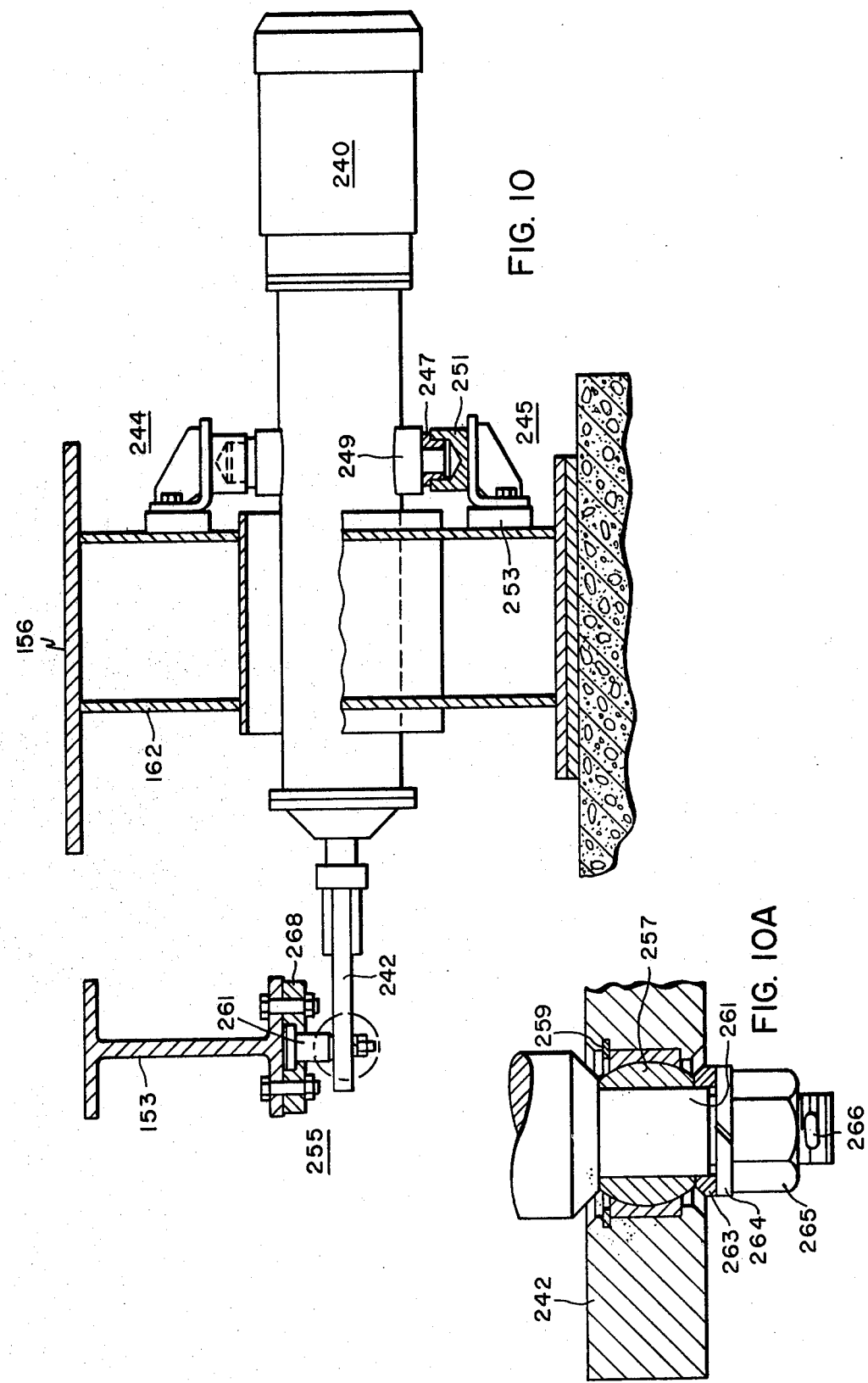
FIG. 10 is a cross-sectional view of a hydraulic cylinder included in the pivotal guide beam switch and taken in the plane X—X of FIG. 3.

FIG. 3 and the cross-sectional view of FIG. 10 taken along line X—X of FIG. 3 show a hydraulic cylinder 240 which controls a push rod 242 fixed to pivotal guide beam section 153 to control, in cooperation with tie rod 227, the positions of both pivotal guide beam sections 147 and 153. Hydraulic cylinder 240 is pivotally maintained in a horizontal plane within an aperture of steel member 162 by trunnion mountings 244 and 245 to permit hydraulic cylinder 240 to maintain its longitudinal axis in line with the longitudinal axis of push rod 242 as it is extended and retracted to control to positions of pivotal guide beam sections 147 and 153. Trunnion mountings 244 and 245 also prevent impact loading of hydraulic cylinder 240 when vehicles travel along pivotal guide beam sections 147 and 153. Trunnion mounting 245 includes a trunnion bushing 247 held between trunnion pin 249 and trunnion bracket 251. Trunnion pin 249 is fixed to hydraulic cylinder 240 and trunnion bracket 251 is fixed to mounting plate 253 which is fixed to steel member 162. Trunnion mounting 244 is substantially identical to trunnion mounting 245 and, therefore, is not explained in detail. Push rod 242, which is controlled by hydraulic cylinder 240, is fixed to pivotal guide beam section 153 by spherical bearing assembly 255. spherical bearing assembly 255 as shown in FIG. 10A includes spherical bearing 257 held in a cavity of push rod 242 by retaining ring 259 and locked onto beam pin 261 by washer 263, lock washer 264, nut 265, and cotter pin 266. Beam pin 261 is maintained between pivotal guide beam section 153 and mounting bracket 268 which is fixed to guide beam section 153.

Figure 11:
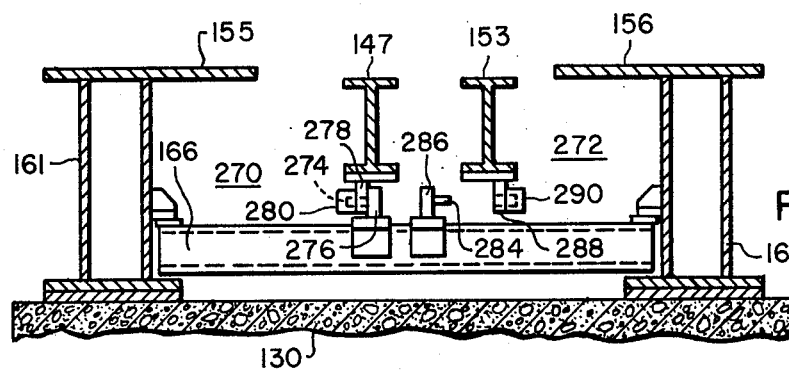
FIG. 11 is a cross-sectional view taken in the plane XI—XI of FIG. 3 and shows apparatus for detecting the position of the pivotal guide beam switch.

The apparatus for positioning pivotal section 147 which directs vehicles between roadways 120 and 122 includes pivotal guide beam section stop 270. The apparatus for positioning pivotal section 153 to direct vehicles between roadways 120 and 124 includes pivotal guide beam stop 272. As shown in FIG. 11, which is a cross-sectional view taken along the line XI—XI of FIG. 3, pivotal guide beam stop 270 is comprised of a pin 274 horizontally mounted to a first retaining plate 276, and a second retaining plate 278 having an annular aperture. Retaining plate 276 is fixed to cross member 166 and retaining plate 278 is fixed to pivotal guide beam section 147 such that, when pivotal guide beam section 147 has its longitudinal axis in-line with the longitudinal axes of guide beams 132 of roadways 120 and 122, retaining plate 276 is flush against retaining plate 278 and pin 274 is disposed within the annular aperture of retaining plate 278 where it is detected by a metal detector 280 fixed across the aperture of retaining plate 278. Similarly, pivotal guide beam stop 272 is comprised of a pin 284, horizontally mounted to a first retaining plate 286, and a second retaining plate 288 having an annular aperture. Retaining plate 286 is fixed to cross member 166 and retaining plate 288 is fixed to pivotal guide beam section 153 such that, when the longitudinal axis of pivotal guide beam section 153 lies along the arc tangential to the longitudinal axes of guide beams 132 of roadways 120 and 124, retaining plate 286 is flush against retaining plate 288 and pin 284 is disposed within the annular aperture of retaining plate 288 where it is detected by a metal detector 290 fixed across the aperture of retaining plate 288.

Figure 12:
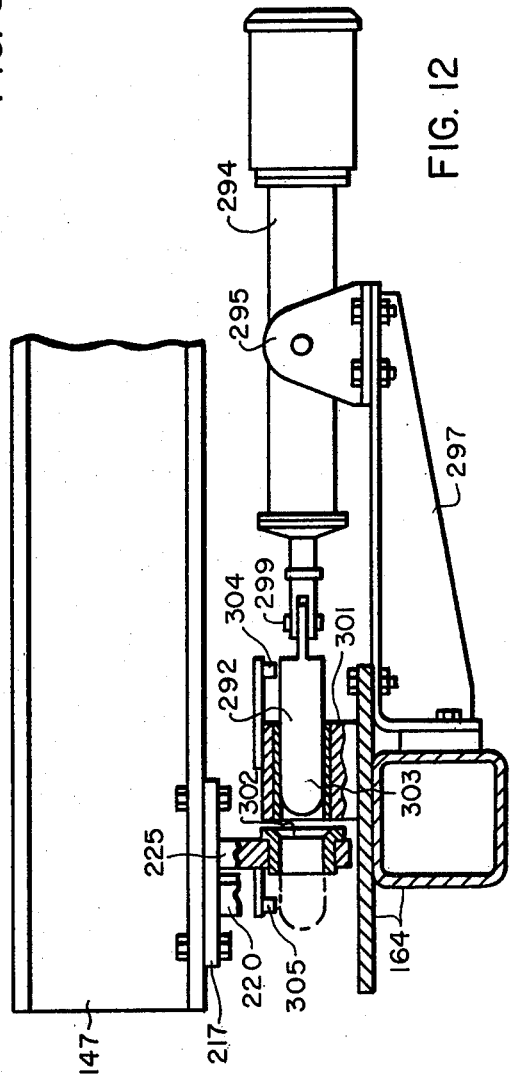
FIG. 12 is a cross-sectional view of a second hydraulic cyclinder included in the pivotal guide beam switch taken in the plane XII—XII of FIG. 3.

Pivotal guide beam sections 147 and 153 are locked in their in-line positions by a locking pin 292 controlled by a hydraulic cylinder 294 as shown in the cross-sectional view of FIG. 12 taken along the line XII—XII of FIG. 3. Hydraulic cylinder 194 is supported by trunnion mountings 295 fixed to platform cross member 164 through mounting bracket 297, and is linked to locking pin 292 through coupling 299. Locking pin 292 is contained by a guide member 301 fixed to platform cross member 164 such that, when the longitudinal axis of pivotal guide beam section 147 is inline with the longitudinal axes of guide beams 132 of roadways 120 and 122, hydraulic cylinder 294 extends locking pin 292 into the aperture in locking bracket 225 depending from mounting plate 217 which is fixed to pivotal guide beam section 147. When locking pin 292 is thus disposed within both locking bracket 225 and guide member 301, travel end 208 of pivotal guide beam section 147 is fixed with respect to platform cross-member 164 so to lock pivotal guide beam section 147 in its in-line position and to absorb lateral forces on pivotal guide beam section 147 induced by vehicles running through the switch. The aperture of locking bracket 225 is provided with a beveled edge 302 and locking pin 292 is provided with a hemispheric nose 303 to allow for minor variances in the relative positions of mounting bracket 225 and guide member 301 between operating cycles of the guide beam switch 118. Also, the beveled edge 302 of the aperture of locking bracket 225 and the hemispheric nose 303 of locking pin 292 permit precise alignment between guide beam 132 of roadway 120 and pivotal guide beam section 147 to be accomplished by the locking pin arrangement of FIG. 11. The beveled edge 302 of the aperture of locking bracket 225 and the hemispheric nose 303 of locking pin 292 combine with the coupling 299 which permits movement in a horizontal plane, and the trunnion mountings 295 supporting hydraulic cylinder 294, which permit movement in a vertical plane, to decrease the axial resistance of locking pin 292 as it is extended into the aperture of locking bracket 225. Metal detectors 304 and 305 are used to determine whether locking pin 292 is in a locked or an unlocked position.

In a similar fashion, when the longitudinal axis of the pivotal guide beam section 153 lies along the arc tangential to the axes of guide beams 132 of roadways 120 and 124, hydraulic cylinder 294 extends to insert locking pin 292 into an aperture of a locking bracket 226 of roller 215 (FIG. 6) to lock pivotal guide beam section 153 in its operative position.

Figure 13:
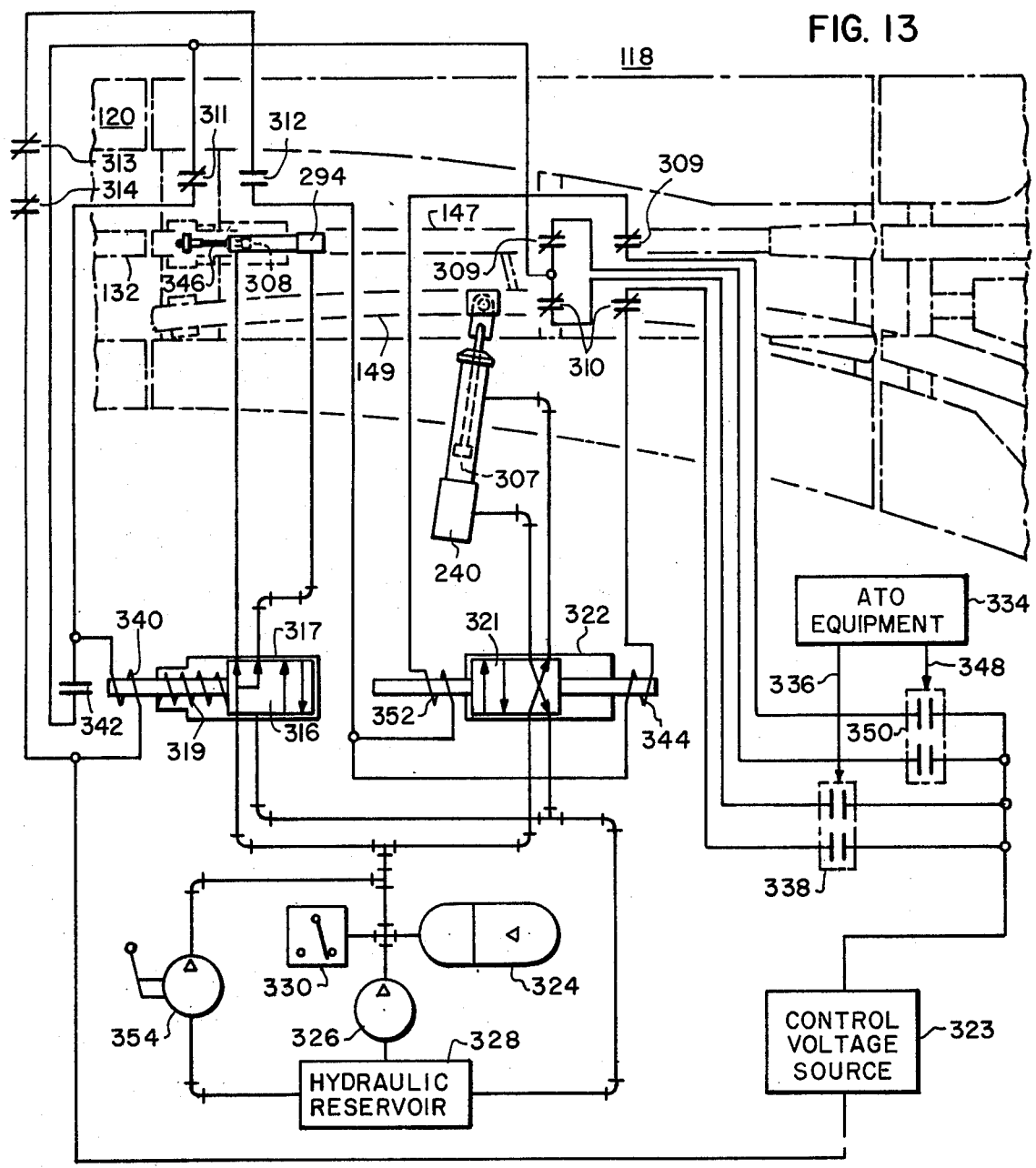
FIG. 13 diagrammatically illustrates how the pivotal guide beam switch is transferred from a first position to a second position.
Figure 14:
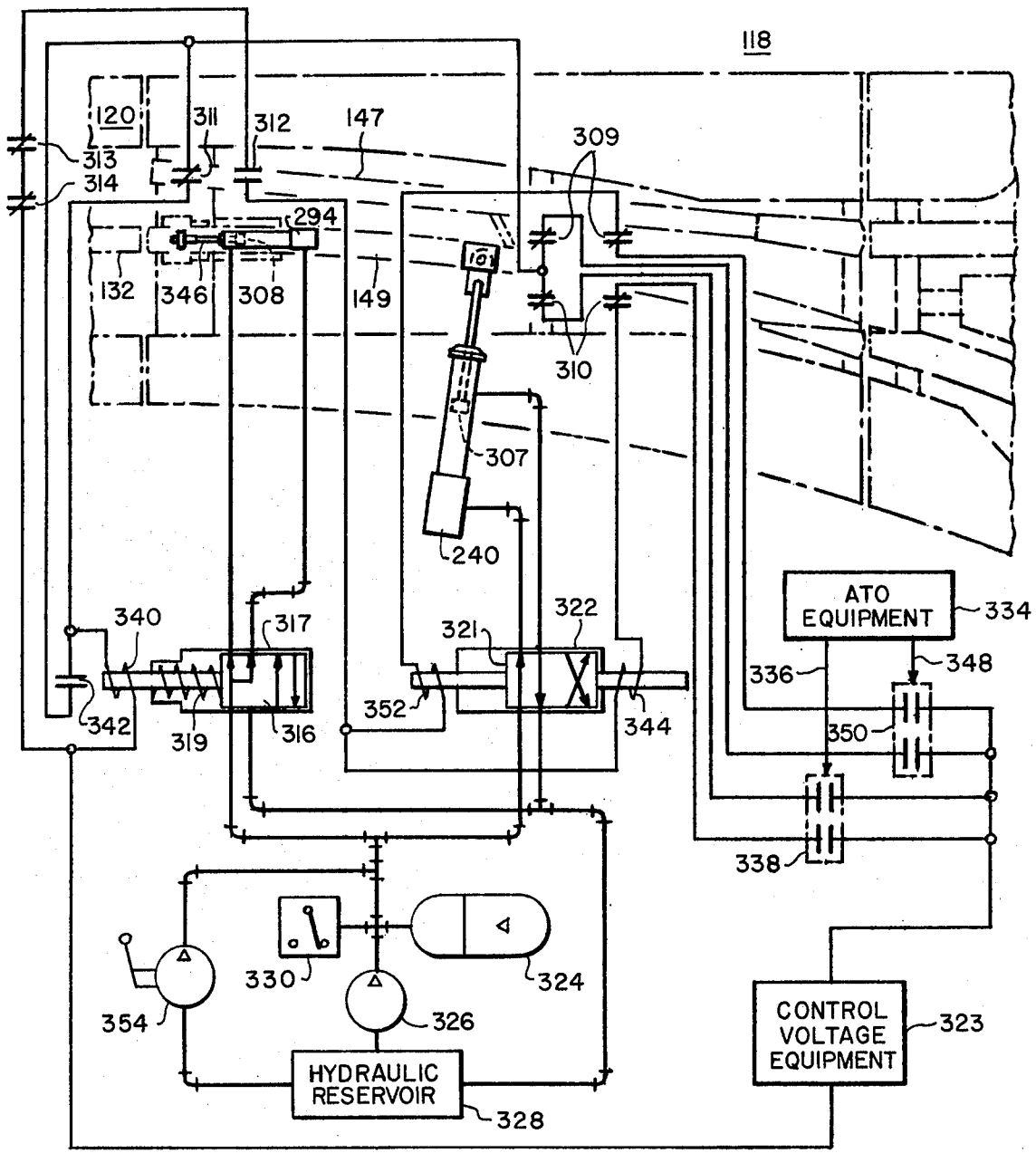
FIG. 14 diagrammatically illustrates how the pivotal guide beam switch is transferred from a second position to a first position.

The operation of pivotal guide beam switch 118 is explained in relation to the schematic diagrams of FIGS. 13 and 14. In FIG. 13, the pivotal guide beam switch 118 is shown by light dashed lines as being in a first position with the axis of pivotal guide beam section 147 in-line with the axes of guide beam 132 of roadways 120 and 122. The guide wheels 65 and 66 of vehicle 36 (FIG. 1) travel along switching guide beam 143 in the same manner as they would follow guide beam 132 of roadway 120 or 122. In FIG. 14, the pivotal guide beam switch 118 is shown by light dashed lines in a second position with the axis of pivotal guide beam section 153 in-line with an arc tangential to the longitudinal axes of guide beams 132 of roadways 120 and 124 for directing vehicles between roadways 120 and 124. The guide wheels 65 and 66 of the transportation vehicle 36 (FIG. 1) follow switching guide beam 149 in the same manner as they would follow guide beam 132 of roadway 120 or 124.

The position of switch 118 is determined by controlling the stroke position of cylinders 240 and 294 in relation to a pressure supply acting through solenoid-type hydraulic valves. The solenoid-type hydraulic valves are controlled in relation to a voltage source acting through an arrangement of electrical contacts.

If guide beam switch 118 is locked in its first position indicated in FIG. 13 when it is determined that a vehicle should be directed between roadways 120 and 124, the position of guide beam switch 118 must be changed to that shown in FIG. 14. While pivotal guide beam switch 118 is locked in the first position of FIG. 13, piston 307 of cylinder 240 is at the lower end of cylinder 240 and piston 308 of cylinder 294 is at the left-hand end of cylinder 294. Pin 274 is disposed within the annular aperture of retaining plate 278 causing the normally closed electrical contacts 309 of metal detector 280 to be maintained open. Pin 284 is outside the annular aperture of retaining plate 288 so that the normally closed electrical contacts 310 of metal detector 290 are closed. Locking pin 292 is extended into the aperture of locking bracket 225 such that it is not detected by metal detector 304 but is detected by metal detector 305, therefore causing normally closed electrical contacts 311 of metal detector 304 to be closed, the normally open electrical contacts 312 of metal detector 304 to be open, and the normally closed electrical contacts 313 of metal detector 305 to be open. Locking pin 292 is not detected by metal detector 306 which is mounted on pivotal guide beam section 153 in substantially the same manner as metal detector 305 is mounted to pivotal guide beam section 147, so that its normally closed electrical contacts 314 are closed. Spool 316 is maintained at the right-hand end of solenoid-spring valve 317 by spring 319. Spool 321 remains in the left-hand end of double solenoid valve 322 from the last cycle of operation of switch 118. The position of spools 316 and 321 is controlled in relation to control voltage source 323 acting through electrical contacts 309, 310, 311, 312, 313 and 314. Valves 317 and 322 are provided a substantially constant hydraulic pressure from accumulator 324 supplied by hydraulic pump 326 which pumps hydraulic fluid from a reservoir 328 in relation to pressure switch 330.

To transfer switch 118 to the position of FIG. 14, the automatic train operation (ATO) equipment 334 provides a switch transfer command signal on line 336 to cause electrical contacts 338 to close. Alternatively, contacts 338 could have been closed by an electrical timer or a manual pushbutton. The closure of electrical contacts 338 completes a circuit through control voltage source 323; electrical contacts 338, 310 and 311, and solenoid 340 of solenoid-spring valve 317; to energize solenoid 340 closing electrical interlock 342 and causing spool 316 of valve 317 to shuttle to the left. This action connects the left side of piston 308 of hydraulic cylinder 294 to the substantially constant pressure provided by accumulator 324 and connects the right side of piston 308 to reservoir 328 which is at atmospheric pressure. The difference in pressure on opposite sides of piston 308 causes it to move to the right. As piston 308 reaches the end of its stroke, locking pin 292, which is coupled to piston 308, is withdrawn from locking bracket 225 so that pivotal guide beam section 147 is unlocked. The withdrawal of locking pin 292 also permits metal detector 305 to close its normally closed contacts 313, and causes metal detector 304 to open its normally closed contacts 311 and to close its normally open contacts 312. The pressure supplied to cylinder 294 is unchanged by the opening of contacts 311 because solenoid 340 is maintained energized through electrical interlock 342.

The closure of contacts 312 completes an electrical circuit through control voltage source 323; contacts 338 and 310; solenoid 344; and contacts 312, 313 and 314; to energize solenoid 344 and cause spool 321 of the valve 322 to shuttle to the right. This action connects the lower side of piston 307 of hydraulic cylinder 240 to the substantially constant pressure provided by accumulator 324 and connects the upper side of piston 307 to reservoir 328 which is at atmospheric pressure. The difference in pressure on opposite sides of piston 307 causes it to move upwards. As piston 307 begins its upward stroke, pin 274 is withdrawn from the aperture in retaining plate 278 permitting metal detector 280 to close its normally closed contacts 309. As piston 307 reaches the end of its upward stroke, retaining plate 286 contacts retaining plate 288 to stop the movement of pivotal guide beam sections 147 and 153, and pin 284 becomes disposed within the aperture of retaining plate 288 causing metal detector 190 to open the normally closed contacts 310.

The opening of contacts 310 interrupts the flow of current through solenoids 340 and 344 causing them to be deenergized. Spool 321 of valve 322 remains at the righthand end of valve 322, but spring 319 shuttles spool 316 to its initial position at the right-hand end of valve 317 to provide the pressure of accumulator 324 to both sides of piston 308. The surface area exposed to accumulator pressure on the left side of piston 308 is smaller than the surface area exposed to accumulator pressure on the right side of piston 308 by an area equal to the area of the end of piston rod 346 of piston 308. This difference in surface area exposed to accumulator pressure results in an net force tending to move piston 308 from right-to-left and causing locking pin 292 to be extended into the aperture of locking bracket 226 to lock pivotal guide beam portion 153 in the position shown in FIG. 14.

As locking pin 292 is extended into the aperture of locking bracket 226, it is not detected by metal detector 304 but is detected by metal detector 306, thereby causing the normally closed contacts 311 of metal detector 304 to be closed, the normally open contacts 312 of metal detector 304 to be open, and the normally closed contacts 314 of metal detector 306 to be open.

If pivotal guide beam switch is locked in its second position indicated in FIG. 14 when it is determined that a vehicle should be directed between roadways 120 and 122, the position of guide beam switch 118 must be changed to that shown in FIG. 13. While pivotal guide beam switch 118 is locked in the second position of FIG. 14, piston 307 of cylinder 240 is at the upper end of cylinder 240 and piston 308 of cylinder 294 is at the left-hand end of cylinder 294. Pin 284 is disposed within the annular aperture of retaining plate 288 causing the normally closed electrical contacts 310 of metal detector 290 to be maintained open. Pin 274 is outside the annular aperture of retaining plate 278 so that the normally closed electrical contacts 309 of metal detector 280 are closed. Locking pin 292 is extended into the aperture of locking bracket 226 such that it is not detected by metal detector 304 but is detected by metal detector 306, therefore causing normally closed electrical contacts 311 of metal detector 304 to be closed, the normally open electrical contacts 312 of metal detector 304 to be open, and the normally closed electrical contacts 314 of metal detector 306 to be open. Locking pin 292 is not detected by metal detector 305, so that its normally closed electrical contacts 313 are closed. Spool 316 is maintained at the right-hand end of solenoid-spring valve 317 by spring 319. Spool 321 remains in the right-hand end of double solenoid valve 322 from the previously explained operation of switch 118.

To transfer switch 118 to the position of Fig. 13, the automatic train operation (ATO) equipment 334 provides a switch transfer command signal on line 348 to cause electrical contacts 350 to close. The closure of electrical contacts 350 completes a circuit through control voltage source 323; electrical contacts 350, 309 and 311; and solenoid 340 of solenoid-spring valve 317; to energize solenoid 340 closing electrical interlock 342 and causing spool 316 of valve 317 to shuttle to the left. This action connects the left side of piston 308 of hydraulic cylinder 294 to the substantially constant pressure provided by accumulator 324 and connects the right side of piston 308 to reservoir 328 which is at atmospheric pressure. The difference in pressure on opposite sides of piston 308 causes it to move to the right. As piston 308 reaches the end of its stroke, locking pin 292, which is coupled to piston 308, is withdrawn from locking bracket 226 so that pivotal guide beam section 153 is unlocked. The withdrawal of locking pin 292 also permits metal detector 306 to close its normally closed contacts 314, and causes metal detector 304 to open its normally closed contacts 311 and to close its normally open contacts 312. The pressure supplied to cylinder 294 is unchanged by the opening of contacts 311 because solenoid 340 is maintained energized through electrical interlock 342.

The closure of contacts 312 completes an electrical circuit through control voltage source 323; contacts 350 and 309; solenoid 352; and contacts 312, 313 and 314; to energize solenoid 352 and cause spool 321 of valve 322 to shuttle to the left. This action connects the upper side of piston 307 of hydraulic cylinder 240 to the substantially constant pressure provided by accumulator 324 and connects the lower side of piston 307 to reservoir 328 which is at atmospheric pressure. The difference in pressure on opposite sides of piston 307 causes it to move downwards. As piston 307 begins its downward stroke, pin 284 is withdrawn from the aperture in retaining plate 288, permitting metal detector 290 to close its normally closed contacts 310. As piston 307 reaches the end of its downward stroke, retaining plate 276 contacts retaining plate 278 to stop the movement of pivotal guide beam sections 147 and 153, and pin 274 becomes disposed within the aperture of retaining plate 228 causing metal detector 280 to open the normally closed contacts 309.

The opening of contacts 309 interrupts the flow of current through solenoids 340 and 352, causing them to be deenergized. Spool 321 of valve 322 remains at the left-hand end of valve 322, but spring 319 shuttles spool 316 to its initial position at the right-hand end of valve 317 to provide the pressure of accumulator 324 to both sides of piston 308. The surface area exposed to accumulator pressure on the left side of piston 308 is smaller than the surface area exposed to accumulator pressure on the right side of piston 308 by an area equal to the area of the end of piston rod 346 of piston 308. This difference in surface area exposed to accumulator pressure results in a net force tending to move piston 308 from right-to-left and causing locking pin 292 to be extended into the aperture of locking bracket 225 to lock pivotal guide beam portion 147 in the position shown in FIG. 13.

As locking pin 292 is extended into the aperture of locking bracket 225, it is not detected by metal detector 304 but is detected by metal detector 305, thereby causing the normally closed contacts 311 of metal etector 304 to be closed, the normally open contacts 312 of metal detector 304 to be open, and the normally closed contacts 313 of metal detector 305 to be open.

Because spool 316 is shuttled to the left-hand end of valve 317 by spring 319, in the event of a power failure, locking pin 292 will be automatically extended. FIGS. 13 and 14 also show a hydraulic hand pump 354 for manual operation of the privotal guide beam switch 118 when the pressure supply from accumulator 324 and pump 326 has failed.

The presently disclosed privotal guide beam switch 118 may be used in combination with a modification of the power rail, signal rail, ground rail and guide beam arrangement explained in relation to FIG. 1 to continuously provide power and control signals to the transportation vehicle 36 as it travels through the pivotal guide beam switch. Moreover, these power and control signals may be provided using the same power and signal collector arrangement as used to provide power and control signals to the vehicle as it traverses the vehicle roadways 120, 122 and 124.

Figure 15:
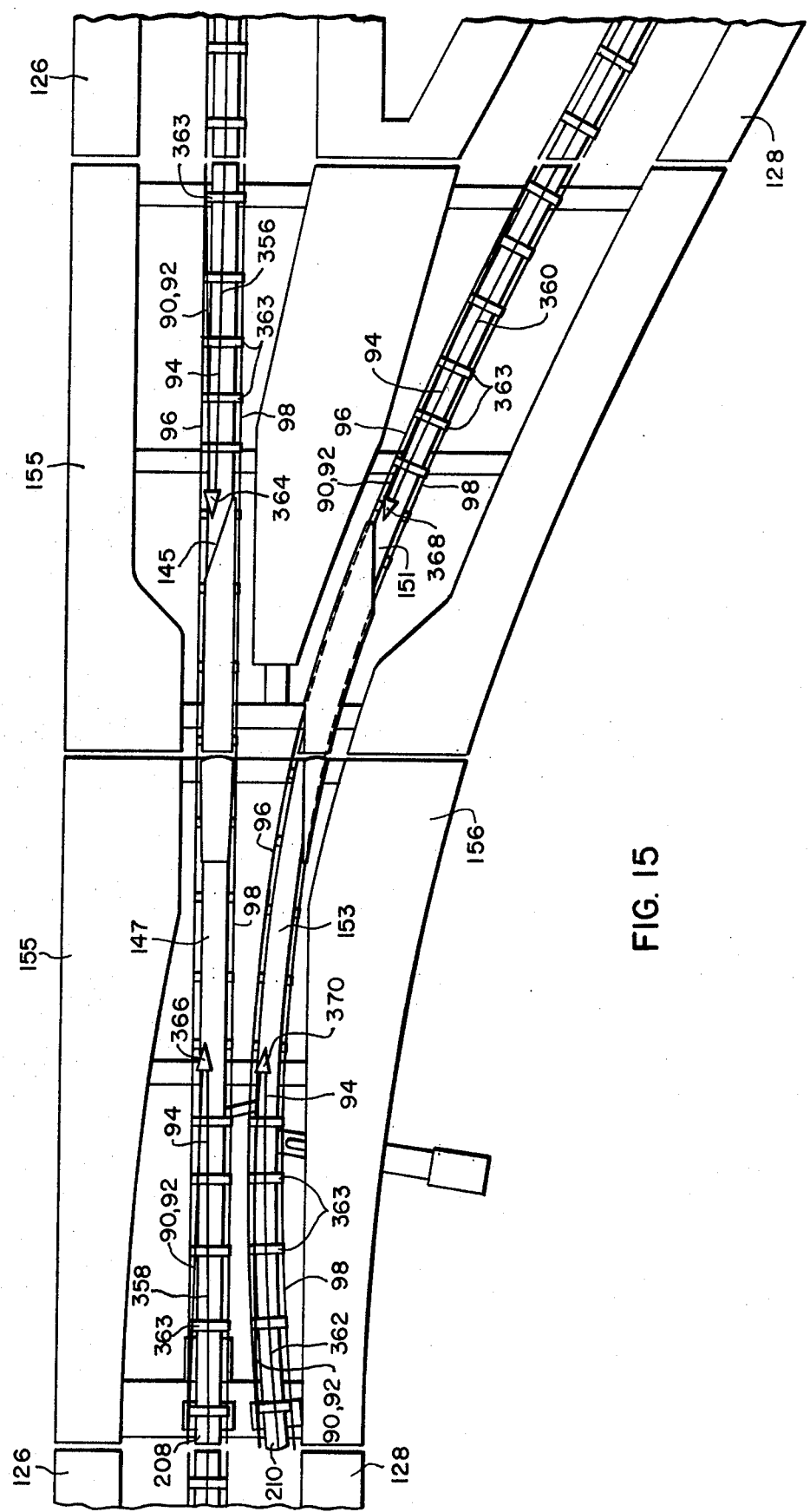
FIG. 15 is a top projection of a power and signal rail arrangement in combination with the first, second and third vehicle roadways, and the pivotal guide beam switch.

FIG. 15 illustrates an embodiment of a combination of the modified signal rail, power rail, ground rail and guide beam arrangments and the pivotal guide beam switch disclosed herein. Tapered rail sections 356, 358, 360 and 362 are each comprised of power rails 90, 92 and 94; ground rail 96; and signal rail 98 mounted on mounting brackets 363 located at longitudinal intervals along the tapered rail sections 356, 358, 360 and 362. Mounting brackets 363 of tapered rail section 356 are fastened to fixed guide beam section 145 between insulative wedge 364 and the end of guide beam section 145 opposite guide beam 132 of roadway 122. Mounting brackets 363 of tapered rail section 358 are fastened to pivotal guide beam section 147 between insulative wedge 366 and the travel end 208 of guide beam section 147. Mounting brackets 363 of tapered rail section 360 are fastened to fixed guide beam section 151 between insulative wedge 368 and the end of guide beam section 151 opposite guide beam 132 of roadway 124. Mounting brackets 363 of tapered rail section 362 are fastened to pivotal guide beam section 153 between insulative wedge 370 and the travel end 210 of guide beam section 153.

The power rail arrangement for use in combination with pivotal guide beam switch 118 which is shown in FIG. 15 provides a power rail gap between insulative wedges 368 and 370 to permit the vehicle wheels 40 of a vehicle traveling between roadways 120 and 122 to cross switching guide beam 149. Similarly, a power rail gap is provided between insulative wedges 364 and 366 to permit the wheels 38 of a vehicle traveling between roadways 120 and 124 to cross switching guide beam 143. These gaps are necessary because the power rails project above the guide beam switching sections. Since ground rail 96 and signal rail 98 do not project above the upper horizontal flange 30 of guide beam 28, rails 96 and 98 require no gap between insulative wedges 364 and 366 or between 368 and 370 to accommodate the wheels of vehicle 36. However, ground rail 96 and signal rail 98 do require a small gap at pivot ends 189 and 190 of pivotal guide beam sections 147 and 153 to allow those guide beam sections to pivot on bearing assemblies 193 and 195.

In tapered rail sections 356, 358, 360 and 362, brackets 363 are sized such that the dimensions between power rails 90, 92 and 94 continuously decrease from dimensions equal to those between the power rails, mounted on guide beam 132 of roadwyas 120, 122 or 124, and previously described in relation to FIG. 1, to dimensions compatible with the dimensions of the bases of insulative wedges 364, 366, 368 and 370. At the base of insulative wedges 364, 366, 368 and 370, the dimensions between the power rails of tapered rail sections 356, 358, 360 and 362 are such that the collection surfaces of power rails 90, 92 and 94 are in the same plane as the sides of the insulative wedges. This gradual change in the dimensions between power rails 90, 92 and 94 of tapered rail sections 356, 358, 360 and 362 is provided to allow the collectors 81, 82 and 83 on the vehicle to disengage and engage the power rails in a smooth fashion so as to reduce mechanical wear of the collectors. The gradual change in dimensions also allows the collectors of vehicles leaving switch 118 to maintain more positive contact with the power rails by preventing the collectors from overshooting the power rails as they engage a tapered rail section. Since there is no substantial gap required in ground rail 96 or signal rail 98 between insulative wedges 268 and 370, or insulative wedges 364 and 366, to accogmodate the wheels of vehicle 36, rails 96 and 98 are maintained in the same relation with respect to guide beam sections 145, 147, 151, and 153 as for guide beam 32 in FIG. 1 and are not tapered as are power rails 90, 92 and 94.

Insulative wedges 364, 366, 368 and 370 are mounted on fixed guide beam section 145, pivotal guide beam section 147, fixed guide beam section 151 and pivotal guide beam section 153, respectively, to prevent arcing between the power rails and their associated collectors as the collector draw away from or approach their associated rails. Insulative wedges 364, 366, 368 and 370 may be made of micarta or other material with similar electrical and physical properties.

Power and control signals are provided to tapered rail section 356 through electrical conductors appropriately connected to the power and control signal rails mounted on guide beam 132 of roadway 122. Power and control signals are povided to tapered rail section 358 through electrical conductors appropriately connected to the power and control signal rails of tapered rail section 356 and passing through a channel between switching guide beam 143 and track surface 158. In a similar manner, power and control signals are provided to tapered rail section 360 through electrical conductors appropriately connected to the power and control signal rails mounted on guide beam 132 of roadway 124. Power and control signals are provided to tapered rail section 362 through electrical conductors appropriately connected to to the power and control signal rails of tapered rail section 360 and passing through a channel between switching guide beam 149 and track surface 159.

Control signals are collected from ground rail 96 and signal rail 98 by vehicles operating in switch 118 in the same manner that they are collected as the vehicle traverses roadways 120, 122 or 124. Power is continuously provided to vehicle 36 as it negotiates switch 118 through a first set of collectors located at a first position on vehicle 36 and a second set of collectors located at a second position on vehicle 36 which is longitudinally displaced from the first collectors by a distance greater than the gap between the bases of insulative wedges 364 and 366 and the gap between the bases of insulative wedges 368 and 370, respectively. Alternatively, in applications where a multiple of vehicles will be coupled together, power signals could be continuously provided to all vehicles if collectors associated with any two vehicles are similarly longitudinally displaced and there is power and control signal communication between the vehicles.

Figure 16:
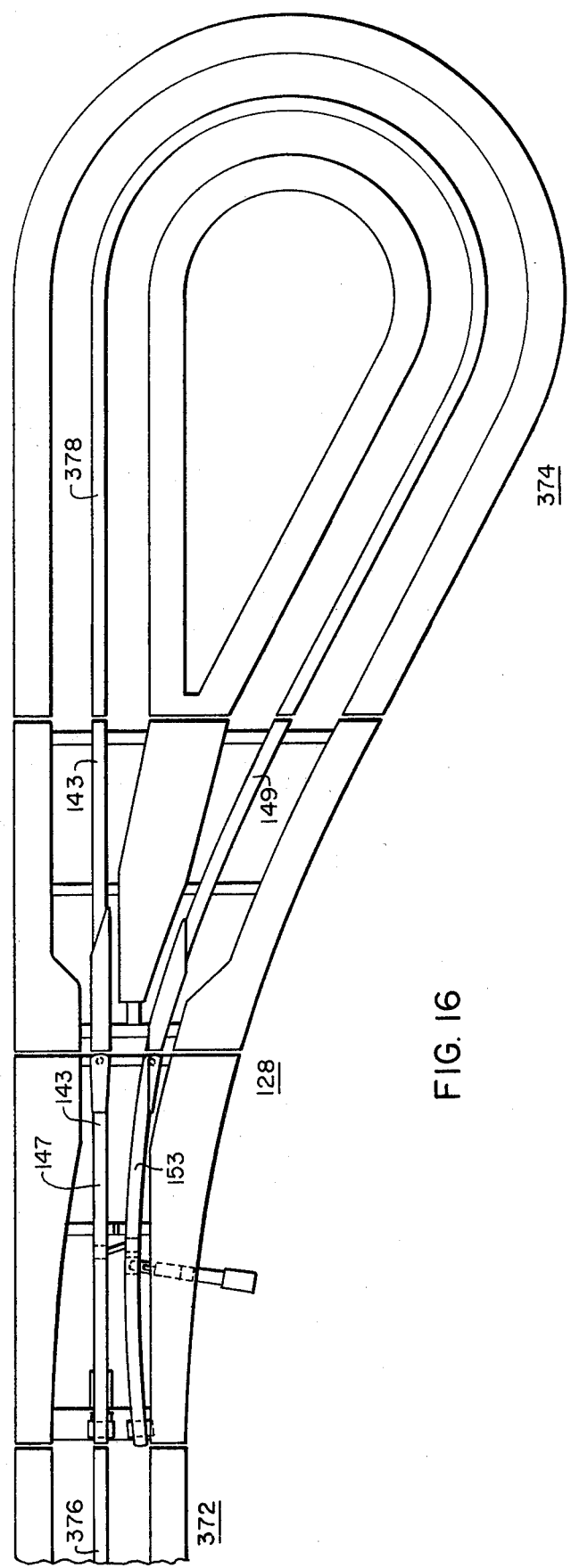
FIG. 16 is a top projection of a pivotal guide beam switch and roadway combination for providing a transportation system with turn-around capability.
Figure 17:
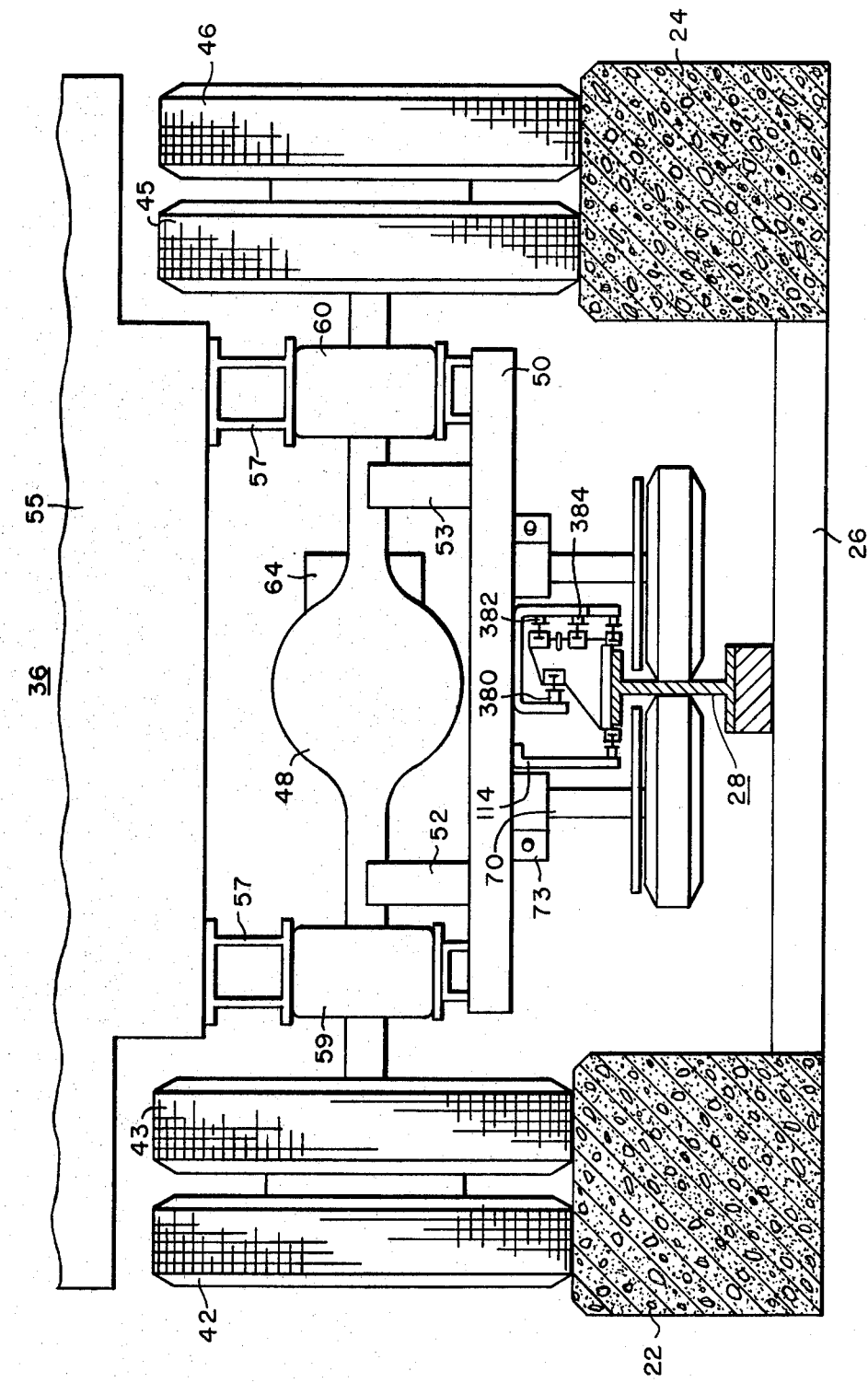
FIG. 17 is a cross-sectional view of a transportation system roadway taken in a plane perpendicular to the longitudinal axis of the roadway and showing a collector arrangement for providing power and control signals to a vehicle in either of two orientations with respect to the roadway.

FIG. 16 illustrates a "turn-around" configuration in which the orientation of vehicle with respect to the roadway can be reserved. The configuration includes pivotal guide beam switch 128 and roadways 372 and 374 which are substantially similar to roadway 20. At the initiation of the "turn-around" operation, a vehicle is in a first orientation with respect to roadway 372. The vehicle enters pivotal guide beam switch 128 from roadway 372 while pivotal guide beam section 147 is in-line with the longitudinal axis of guide beam 376 and 378 of roadways 372 and 374, respectively. The vehicle travels along switching guide beam 143, arrives at roadway 374, and follows the loop of roadway 378 until the vehicle again arrives at pivotal guide beam switch 128. As the vehicle is traveling the loop of roadway 374, pivotal guideway section 153 is moved in-line with the arc tangential to the longitudinal axes of guide beams 376 and 378 of roadways 372 and 374. The vehicle then follows switching guide beam 149 until returning to the roadway 372 where it is in the opposite orientation from the one it had originally. The orientation of the vehicle could also be reversed by causing it to traverse roadway 374 in an analogous manner.

The power and signal rail mounting arrangement previously described in relation to FIGS. 1 and 2 cooperating with the redundant, complementary power rail collector arrangement shown in FIG. 16 will provide power and control signals to a vehicle regardless of the orientation of the vehicle with respect to the roadway. The vehicle is provided with a first set of power collectors substantially similar to collectors 81, 82 and 83 mounted on the left side of the vertical plane containing the web 34 of guide beam 28 as shown in FIG. 1.

The vehicle is also provided with a second set of power collectors 380, 382 and 384 which are mounted conversely with respect to the first set of collectors and on the right side of the vertical plane containing the web 34 of guide beam 28. In the signal rail arrangement shown in FIGS. 1 and 2, the power rails are located to the left of the vertical plane containing the web 34 of guide beam 28. Using the first set of power collectors, a vehicle in a first orientation with respect to roadway 372 would be provided power and control signals when moving in forward or reverse directions. Using power collectors 380, 382 and 384, a vehicle in a second orimntation, turned 180° from the first orientation, would be provided power and control signals when moving in the forward or reverse direction.

Since the vehicle control signals are determined from an inductive reading of the voltage difference between the control voltage and ground potential, collectors 95 and 97 are interchangeable with rails 96 and 98. Redundant, conversely mounted signal and ground rails are, therefore, unnecessary. When the vehicle is in the second orientation, and power collectors 380, 382 and 384 are operative, collector 95 is used as a signal collector and collector 97 is used as a ground collector. Referring to the turn-around configuration of FIG. 15, as the vehicle traverses the roadway 372 moving in a forward or reverse direction and while in a first orientation, it would obtain power and control signals from the collectors 90, 92, 94, 96 and 98. If the vehicle were moving in the opposite orientation with respect to the roadway 374, it would use the collectors 380, 382, 384, 96 and 98 as it moved in the forward and reverse directions.

I claim:

1. For transportation system having at least one vehicle, a plurality of wheel and axle assemblies for carrying each vehicle, power and signal collectors mounted on each vehicle, a roadway for each vehicle to traverse, and a top flanged guide beam associated with said roadway for directing each vehicle along said roadway, the apparatus comprising:

at least one power rail associated with said roadway for providing electromotive energy to said vehicle;

at least one signal rail associated with said roadway for providing control signals to said vehicle;

means for mounting said power rail and said signal rail to the top flange of said guide beam, with said mounting means being positioned above said top flange to improve vertical and lateral alignment of said power and signal rails with said collectors, and to permit modular assembly of said power rail and said signal rail with said guide beam.

2. The apparatus of claim 1, in which said mounting means positions said power and signal rails in a predetermined relationship to the center of rotation of said vehicle wheel and axle assemblies to improve vertical and lateral alignment of said power and signal rails with said collectors.

3. The apparatus of claim 1, in which said mounting means positions the collection face of said power rails and signal rails in a vertical plane to reduce accumulation of dirt and moisture on said power rail and said signal rail.

4. The apparatus of claim 1, in which said mounting means positions said power rails above said guide beam and in lateral relation to the vertical center plane of said guide beam to permit forward or reverse operation of each vehicle having either a first or second orientation with respect to said roadway.

5. The apparatus of claim 1, in which said mounting means positions three of said power rails disposed in a geometrically triangular relationship to provide a three-phase power supply with limited reactive interference between phases.

6. For a transportation system having at least one vehicle, a roadway for said vehicle to transverse, a vertically webbed guide beam having at least two sections and associated with said roadway for directing said vehicle along said roadway, and power and signal collectors mounted on said vehicle, the apparatus comprising:
    at least one power rail supported above said guide beam for coupling with said power collector for providing electromotive energy to said vehicle;
    at least one signal rail supported by said guide beam for coupling with said signal collector for providing control signals to said vehicle; and
    conductors supported between said guide beam sections in the plane of said vertical web of said guide beam for providing electromotive energy to said power rails and control signals to said signal rails.

7. The apparatus of claim 6, including shields covering said conductors for maintaining the continuity of said web of said guide beam between said sections where said conductors are provided.

8. For a transportation system having at least one vehicle, power and control signal collectors fixed to said vehicle, a plurality of roadways for said vehicle to traverse, a top flanged guide beam associated with each of said roadways for directing said vehicle along said roadway, and guide beam switches comprised of top flanged, pivotal guide beams for directing said vehicle between first and second of said roadways or between first and third of said roadways, the apparatus comprising:
    a power rail for providing electromotive energy to said vehicle;
    a signal rail for providing control signals to said vehicle; and
    means for mounting said power rail and said signal rail to the top flange of said pivotal guide beam of said guide beam switch to maintain power to the vehicle as it is directed through the switch, with said mounting means being positioned above the top flange to improve the vertical and lateral alignment of said power and signal rails with said collectors, and to permit modular assembly of said power rail and said signal rail with said pivotal guide beam.

9. The apparatus of claim 8, in which said mounting means positions said power rail and said signal rail from said top flange of said pivotal guide beam to reduce accumulation of dirt and moisture on said power rail and said signal rail.

10. The apparatus of claim 9, in which said mounting means positions said power and signal rails substantially close to the center of rotation of said vehicle wheel and axle assemblies to improve vertical and lateral alignment of said power and signal rails with said collectors.

11. The apparatus of claim 8, in which said mounting means positions said power rail and said signal rail obliquely with respect to each other so that said power collectors gradually disengage and engage said power rails as said vehicle is directed through said guide beam switch.

12. The apparatus of claim 11, including insulative wedges provided at one end of said power rails mounted to said pivotal guide beams to reduce arcing as said power collectors disengage and engage said power rails.

* * * * *